No. 670,095. Patented Mar. 19, 1901.
R. C. BERRY.
FLUID PRESSURE ENGINE.
(Application filed Apr. 28, 1900.)
(No Model.) 3 Sheets—Sheet 1.
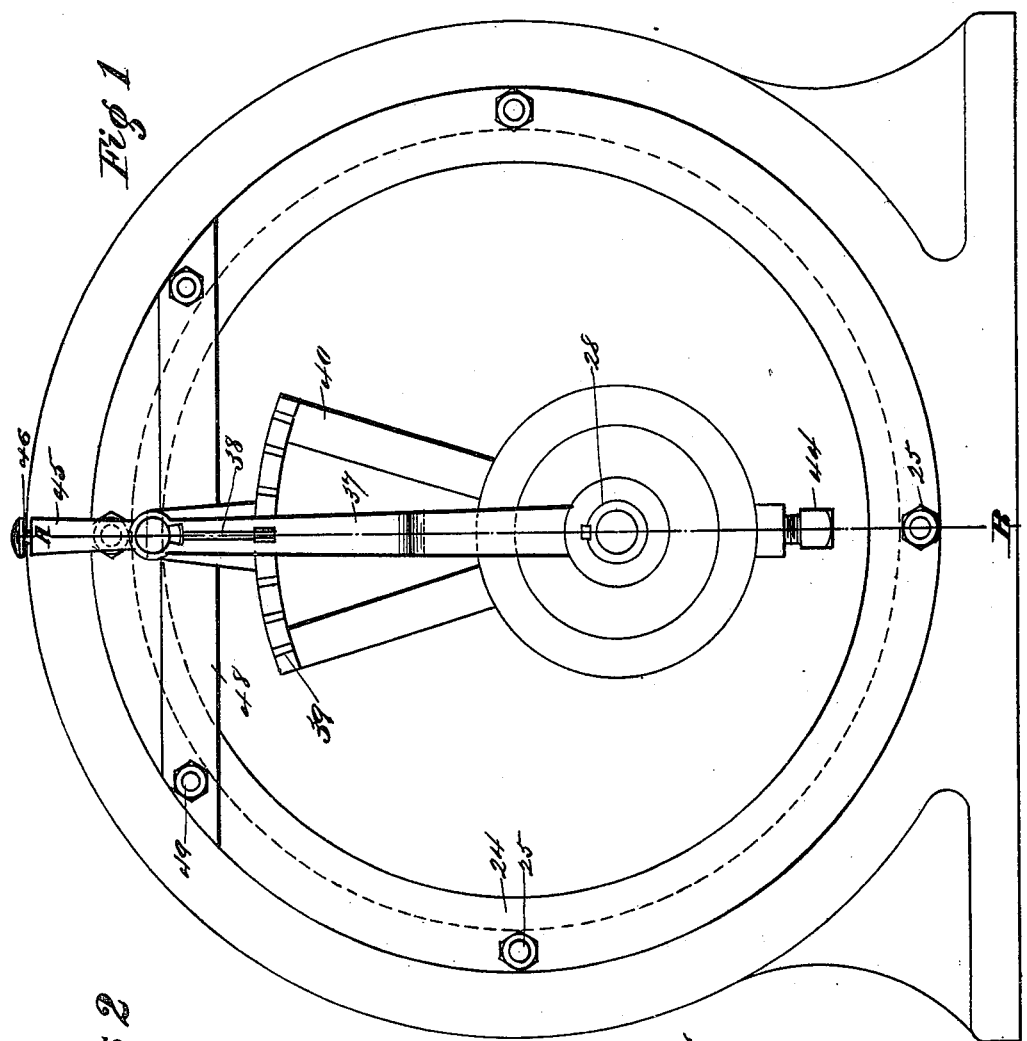
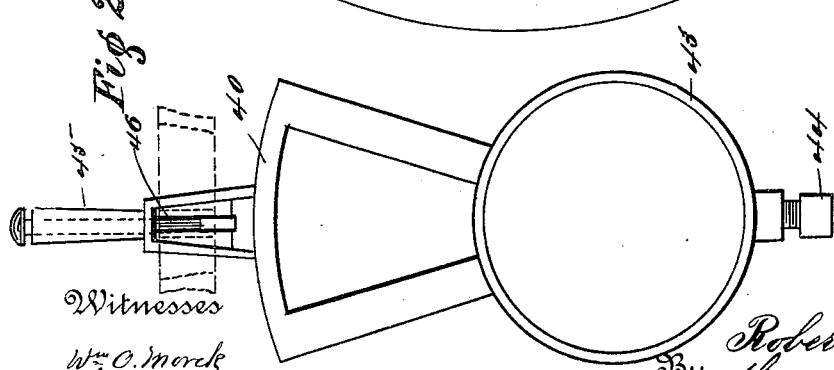
Witnesses
Wm. O. Morck
George W. Laughton
Inventor
Robert C Berry
By Thompson Bell
Attorney.

No. 670,095. Patented Mar. 19, 1901.
R. C. BERRY.
FLUID PRESSURE ENGINE.
(Application filed Apr. 28, 1900.)
(No Model.) 3 Sheets—Sheet 2.
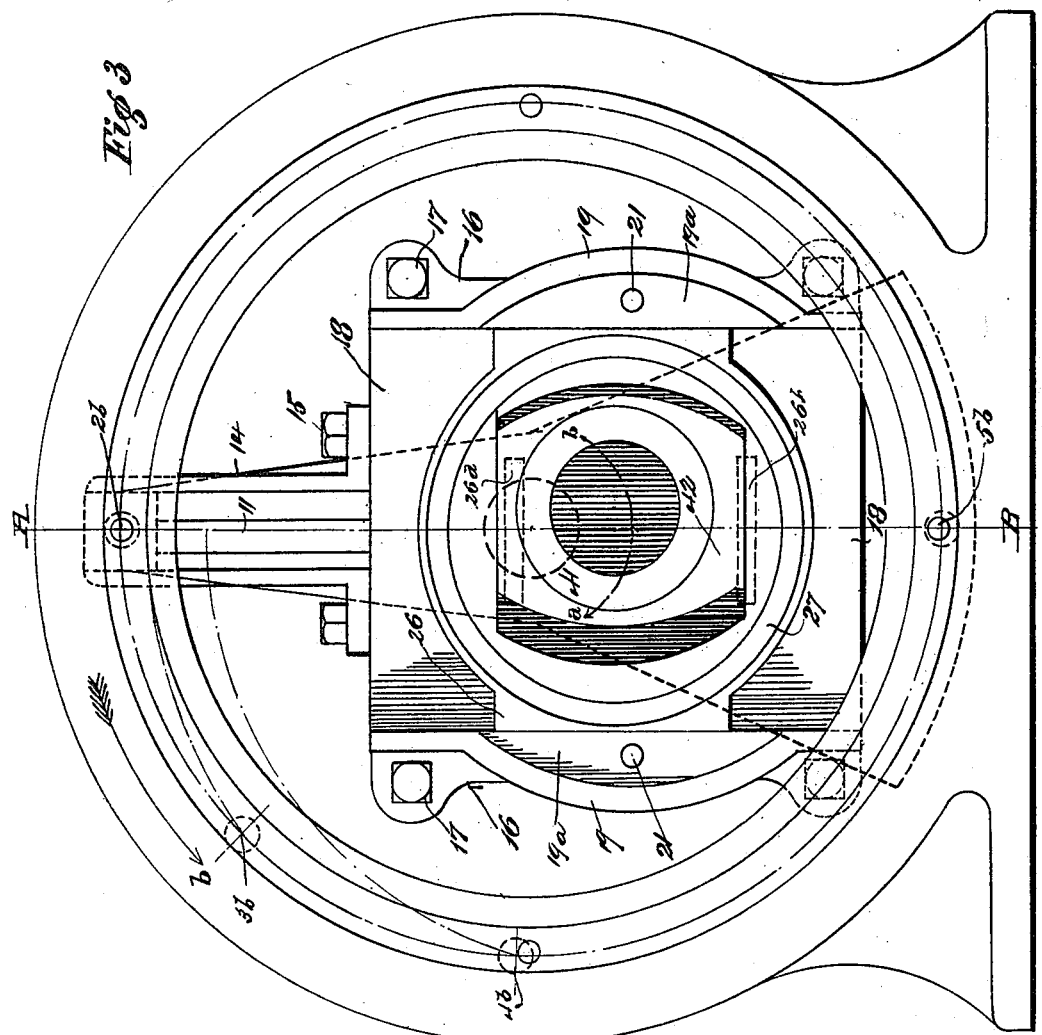
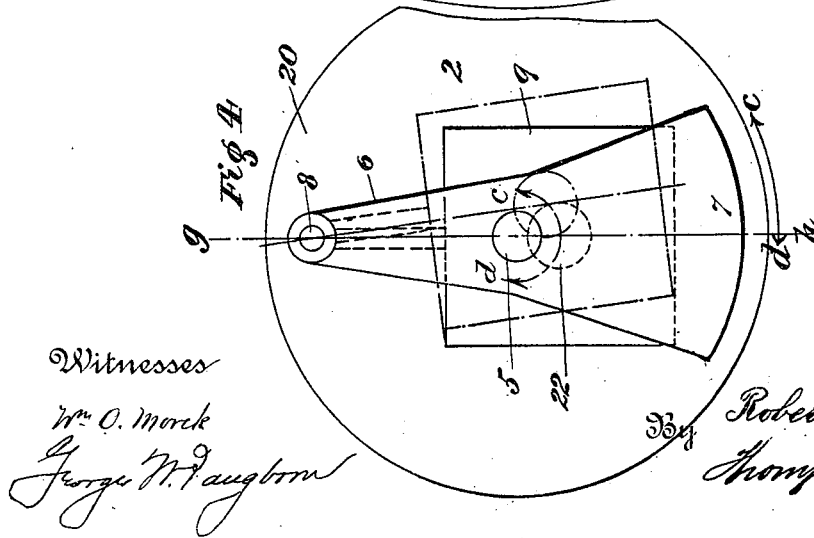
Witnesses
Wm O. Morck
George W. Daughtrn
Inventor
Robert C. Berry
By
Thompson & Bell
Attorney.

No. 670,095. Patented Mar. 19, 1901.
R. C. BERRY.
FLUID PRESSURE ENGINE.
(Application filed Apr. 28, 1900.)
(No Model.) 3 Sheets—Sheet 3.
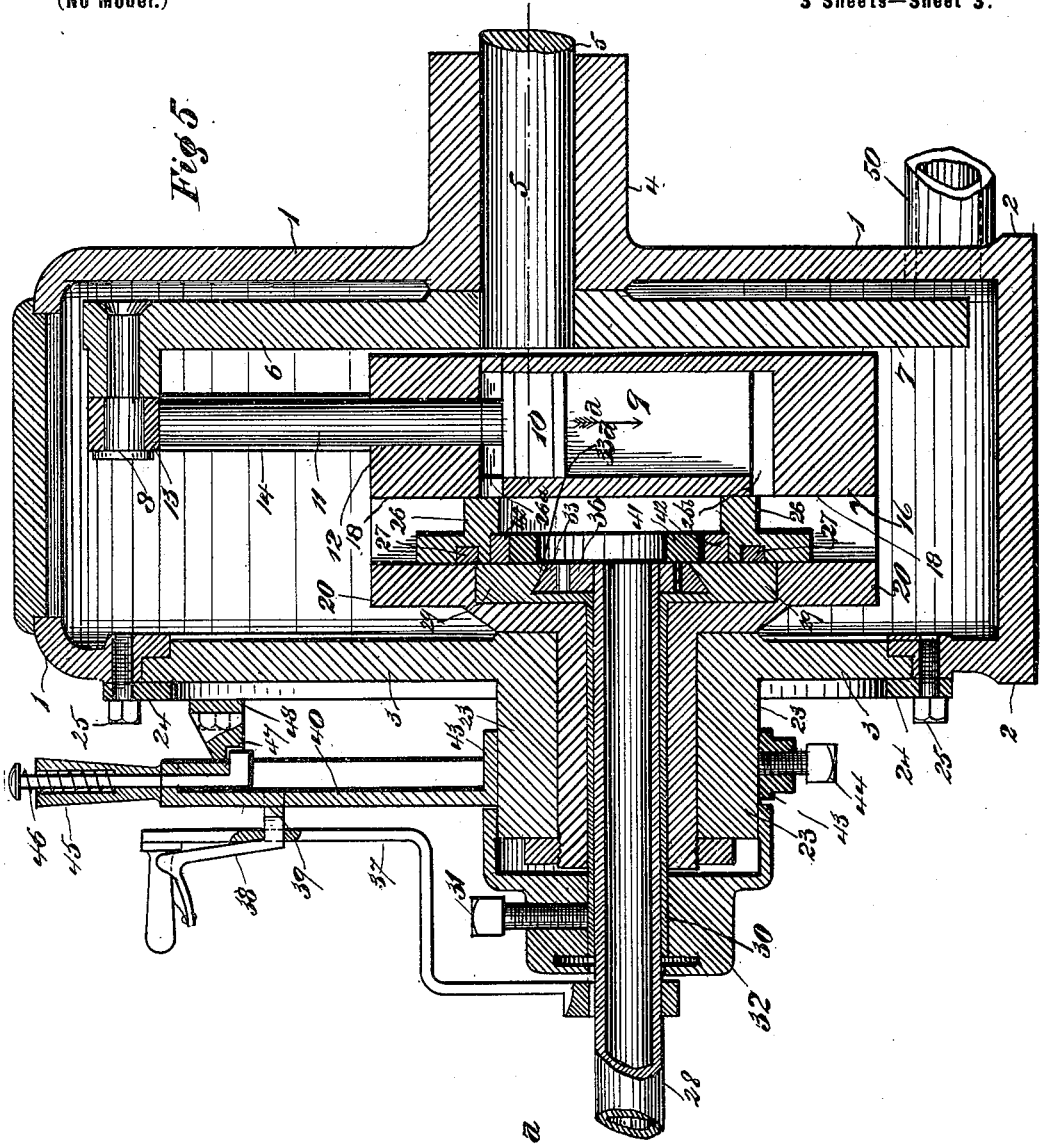
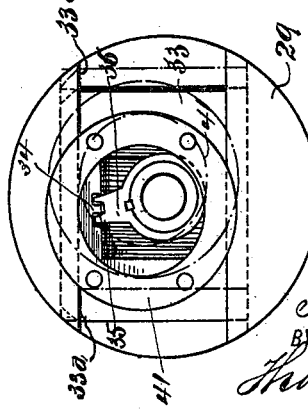
WITNESSES:
Wm O. Morck
George W. Pangborn
INVENTOR
Robert C. Berry
BY
Thompson & Bell
ATTORNEY.
THE NORRIS PETERS CO., PHOTO-LITHO., WASHINGTON, D. C.

UNITED STATES PATENT OFFICE.

ROBERT C. BERRY, OF INDIANAPOLIS, INDIANA, ASSIGNOR OF FIVE-EIGHTHS TO GEORGE W. PANGBORN AND JOHN FEIGEN, OF SAME PLACE.

FLUID-PRESSURE ENGINE.

SPECIFICATION forming part of Letters Patent No. 670,095, dated March 19, 1901.

Application filed April 28, 1900. Serial No. 14,695. (No model.)

*To all whom it may concern:*

Be it known that I, ROBERT C. BERRY, a citizen of the United States, residing at Indianapolis, in the county of Marion and State of Indiana, have invented new and useful Improvements in Fluid-Pressure Engines, of which the following is a specification.

My invention relates to certain new and useful improvements in steam or fluid-pressure actuated engines; and in this specification and claims whenever I use the term "steam" I wish it understood that such term includes any expansive fluid, although this my invention is especially applicable to that class of engine which is actuated by the expansive force of steam.

The object of my invention is to provide a simple, durable, and compact fluid-pressure engine the working parts of which will be completely inclosed and concealed; also, to provide a simple and effective means whereby the eccentric by which the slide-valve is reciprocated may be shifted to change the point of "cut-off" of the slide-valve and whereby the direction of rotation of the engine can be instantaneously reversed; also, to provide means whereby the axis of the trunnion of the steam cylinder or chamber may be moved to either side of the axis of the main or driving shaft at such times as when said piston and its crank stop on either extreme centers or "dead-points" for the purpose of changing the position of said crank center relative to the cylinder and driving-shaft and permitting said engine to start. I attain these objects by means of the mechanism illustrated in the accompanying drawings, in which similar numerals of reference designate like parts throughout the several views.

Figure 1 is an elevational view of the engine, showing the reversing-lever and the shifting-handle of the rotative disk by which the position of the axis of the trunnion for supporting the steam cylinder or chamber is changed. Fig. 2 is a detail view of said segment. Fig. 3 is an end elevational view of the engine, showing the disk for supporting said cylinder and the steam-chest cover removed. Fig. 4 is a diagram view showing the relative positions of the cylinder, driving-shaft, and the crank when on the dead point or center. Fig. 5 is a sectional elevational view of the engine, taken through the line A B, (see Figs. 1 and 3;) and Fig. 6 is a detail view of the eccentric-ring and the shifting yoke.

The class of engine to which my invention is particularly applicable is of the rotary reciprocating type and consists of an inclosing casing or frame 1, having the integral base 2 and the end-inclosing disk or cover 3. Integral on the casing or frame 1 and central therewith is formed the journal-bearing 4, in which is journaled the main crank-shaft 5, and on the inner or inclosed crank end of said shaft is firmly secured the crank 6, having the counterbalance-weight 7, and said crank is provided with the crank-pin 8.

The cylinder or steam chamber 9 may be either cylindrical or rectangular in cross-section, preferably the latter, for the purpose of reducing the space between the center of said piston or steam chamber and the crank 6, and said chamber is provided with the reciprocating piston 10, to which is secured the piston-rod 11, which latter accurately fits the rodway 12, formed integral on the end of the chamber 9, and the stub end 13 of said piston-rod 11 is adapted to receive the crank-pin 8. Guides 14, between which the stub end 13 fits and slides, are provided for the purpose of relieving said piston-rod 11 from all transverse stress when working.

The rectangular steam or piston chamber 9 is provided with the removable cover 16, which is accurately faced to a true surface and is removably secured to said piston-chamber by the bolts 17, and said cover has the valve-chest 18, the ends of which are open to exhaust formed integral thereon, and is provided with the bearing-face 19ª and the flanges 19, both of which are turned truly to receive the disk cover 20. Said disk cover being truly turned and faced on its edge and inner bearing-surfaces is secured to said valve-chest by suitable bolts 21. The trunnion 22 is bored centrally and longitudinally and is formed central with and integral on said cover-disk 20 and is journaled in the bearing 23, formed integral on the shifting disk cover 3, so that the axis of said trunnion is at right angles with the line of motion of said reciprocating piston 10 and intermediate between the ends of the travel of the latter, or the pivotal center of the said cylinder or chamber 9 is located eccentrically on said cover 3, and therefore is eccentric with the axis of the driving or crank shaft 5, and the extent of the eccentricity of said trunnion or pivotal center of said cylinder or chamber with the axis of said crank-shaft being equal to half the stroke of the piston 10. The main frame or casing 1 is turned or recessed on its side opposite to the main or driving crank-shaft-journal end thereof to receive the shifting or rotatable cover 3, and the said annular recess is concentric with the axis of the main or crank shaft 5. The cover 3 is held in said recess by a keep-ring 24, which is bolted to said casing 1 by the bolts 25.

A slide-valve 26, the central portion of which is chambered to form a steam-receiving chest or chamber, is adapted to slide and to reciprocate on the steam-chest face 18, formed on the cylinder-cover 16 and between the side or inclosing walls thereof to alternately open the ports $26^a$ and $26^b$ to steam and exhaust. The valve 26 is provided with a packing-ring 27, which is fitted in an annular groove formed in the back thereof, and the said ring 27 is provided for the purpose of forming a steam-tight joint between the disk 20 and the back of the slide-valve 26. The steam-pipe 28 passes centrally through the bore of the trunnion 22 and connects with the steam-receiving chamber of the valve 26.

The disk 20 is provided with an annular recess adapted to receive the disk 29, which latter is formed integral on the inner end of the tubular supporting-stem 30. The tubular supporting-stem 30 is turned truly on its exterior surface to accurately but loosely fit in the bore of the trunnion 22, through which latter it extends, and said stem 30 is also bored truly to accurately but loosely fit over the steam-pipe 28 and form a bearing for the latter. The tubular stem 30 is held in fixed position relatively to the disk 3 by a set-screw 31, which latter is screwed through the reduced portion of the cap-collar 32. The cap-collar 32 is provided with an enlarged recess or bell-mouth which receives and laps over the end of the trunnion-journal 23, whereon it is securely held either by being pressed thereon, screwed, or otherwise secured. The disk 29 has a straight recess $33^a$, extending centrally and diametrically across its face, and the longitudinal or guiding edges of said recess are dovetailed to receive the similarly-formed edges of the sliding or eccentric block 33, which accurately fits and slides in said recess. The sliding or eccentric block 33 is cut out at its central portion to permit the steam-pipe 28 to pass therethrough, and on one of the inner longitudinal side portions of said recess are formed gear-teeth 34, which are adapted to engage the teeth 35, formed on the end of the shifting arm 36. The arm 36 is firmly keyed on the inner end of the steam-pipe 28, and on the outer end of said tubular shaft or steam-pipe 28 is secured the reversing-lever 37, which latter is provided with a suitable locking-latch 38, adapted to engage the notches 39, formed in the segment 40, and by which means said lever is held in any desired position relative to said segment. The eccentric-ring 41 is secured to the eccentric or sliding block 33 in such a position that its axis or center will be at all times throughout its changes of position eccentric with the axis of the trunnion 22, and the extent of this eccentricity is equal to the half-travel of the slide-valve at mid-gear when the sliding block 33 is in its mid-position. When it is required to either increase or diminish the eccentricity of the eccentric-ring 41, and consequently the travel of the slide-valve 26, for either a later or an earlier period of cut-off of the steam, the slide-block 33 and its eccentric-ring 41, secured thereto, is moved in a straight line by means of the reversing-lever 37, and when it is required the engine the said eccentric-ring or eccentric 41 is moved till it occupies a position on the opposing side of the axis of the trunnion 22—as, for example, the position shown in dotted lines in Fig. 6. The eccentric-yoke 42 is bored out truly to receive the eccentric-ring 41 and is faced truly at its edges to fit the yoke-receiving recess formed in the slide-valve 26, which latter recess is made of sufficient length to permit the free and full travel of the said yoke. (See Fig. 3.)

The axis or center of the hub 43 of the segment 40 is bored to receive the journal-bearing 23 and is firmly secured thereon to turn with the disk-cover 3 by a set-screw 44. Integral on the segment 40 is formed the handle 45, by means of which the said segment and the cover 3 are turned to move the pivotal axis of the cylinder 9 to either side of the driving or crank shaft 5, and which mechanism will be hereinafter referred to. A spring latch or catch 46 extends through the handle 45 and is adapted to engage the stop-notch 47, formed in the central portion of the bar 48. The bar 48 is rigidly secured to the casing 1 of the engine at its ends by suitable bolts 49.

The operation of the engine is as follows: Steam is first admitted into the inner-chamber portion of the slide-valve 26 by means of the steam or eccentric shifting shaft 28, thence through the end port $26^a$ into the steam chamber or cylinder 9 to move the piston 10 to the opposite end of said cylinder or chamber in the direction of the arrow $a$, and thereby cause the crank to rotate either in a right-hand or a left-hand direction, according as the position of the eccentric 41 is set for a right-hand or a left-hand rotation of the driving-shaft. In this case suppose, for example, the engine is rotating in a right-hand direction. Then while the piston 10 traverses in the direction of the arrow $a$ the crank 8 is caused to move in the direction shown by the arrow $b$, from the position $2^b$ to the position $3^b$, thence to the position 4$^b$, at which position the valve 26 is moving in a direction to close the port 26$^a$ to steam and to open it to exhaust and at the same time to open the opposite port 26$^b$ to steam till finally the crank-pin 8 arrives at the position 5$^b$, at which position the piston 10 has reached the end of its stroke and the end port 26$^b$ is now open to admit live steam to the opposite end of the cylinder 9 to cause the said piston 10 to travel in the opposite direction and to continue to apply power to said crank 8 throughout the remaining portion of its path of revolution. The steam is exhausted through the open ends of the steam-chest into the casing 1 and escapes into the atmosphere through the exhaust-pipe 50. The steam cylinder or chamber 9 rotates with and necessarily must make the same revolutions as the crank 8, with which it is connected and which motion needs not be particularly described and traced throughout its path, as the same can be clearly understood by an inspection of Figs. 1 and 3. It will be observed that the position of the eccentric 41 may be changed by means of the reversing-lever 37, which is secured on the tubular eccentric shifting shaft or steam-pipe 28, and by this lever said shaft is turned to cause a change of position of the eccentric 41 to reverse the engine or to change the points of "cut-off," (see particularly Fig. 6, showing said eccentric in full and dotted lines, as hereinbefore described,) and these changes of position of said eccentric may be readily accomplished while the engine is either in motion or at rest without injury to the working parts of the engine. When single-cylinder reciprocating engines stop at their dead-centers—that is, in such position that the longitudinal center line of the piston-rod 11, the center of the crank 8, and the center of the driving-shaft 5 fall in line—it becomes necessary to rotate the driving-shaft till the dead-center is passed. To avoid this inconvenience, I provide a new means whereby the crank 8 is moved out of its dead-center, or, which is the same thing, the pivotal center or trunnion 22 of the cylinder 9 is moved to either side of the center of the driving-shaft 5, and the dead-center is immediately removed. To accomplish this, the latch 46 is disengaged from its notch 47 and the disk-cover 3 is rotated in either direction (indicated by the arrows $c$ and $d$) by means of the lever 45 to swing the center of the trunnion 22 of the cylinder 9 into position on either side of the driving-shaft 5—as, for instance, the position indicated by broken lines in Fig. 4. It will be observed that the reversing-lever 37 when placed in position for right-hand rotation is held in its relative position to the segment 40 and undergoes no change whatever by reason of the movement of the disk 3, and if it is required to reverse the motion of the engine the position of the eccentric 41 can only be changed for such change of motion by the reversing-lever 37.

Having thus fully described this my invention, what I claim as new and useful, and desire to cover by Letters Patent of the United States therefor, is—

1. In a fluid-pressure engine, the combination with a steam-cylinder pivotally mounted, and its reciprocating piston, of a crank-shaft opposite to said cylinder and having its axis eccentric with the pivotal center of the latter, said piston connected directly to said crank-shaft, and said cylinder having its pivotal center adjustably mounted relatively to said crank-shaft.

2. In a fluid-pressure engine, the combination with a double-acting steam-cylinder mounted to rotate on a transverse axis, a reciprocating piston, means for alternately supplying the steam to the opposite ends of said cylinder and exhausting it therefrom, a crank-shaft opposite to and eccentric with the transverse axis of said cylinder, and means for connecting said piston directly to said crank-shaft, of means for supporting said rotative center of said cylinder whereby said center may be rotated in a path concentric with the axis of said crank-shaft, substantially as and for the purpose set forth.

3. In a fluid-pressure engine, the combination with a double-acting steam-cylinder mounted to rotate on a transverse axis, means for alternately supplying the steam to the opposite ends of said cylinder and exhausting it therefrom, an opposing crank-shaft eccentric with the transverse axis of said cylinder, a reciprocating piston connected directly to said crank-shaft, of means whereby the relative positions of the pivotal center of said cylinder and the axis of the crank-shaft may be changed either while the latter is in motion or at rest and independently of the steam-distributing mechanism, substantially as and for the purpose set forth.

4. In a fluid-pressure engine, the combination with a cylinder, a piston adapted to reciprocate in said cylinder, a valve-chest on said cylinder and having both its ends open to exhaust, and having ports connecting said valve-chest and the opposite ends of said cylinder, of a valve accurately fitted in said valve-chest and adapted to reciprocate therein, said valve having a central steam-receiving chamber, a trunnion on said steam-chest or valve-chest, suitable trunnion-bearings, and a steam-pipe passing centrally through said trunnion and connecting the said valve-chamber, a non-rotative eccentric within said valve-chamber, a fixed tube surrounding said steam-pipe between said trunnion and the latter and whereby the said eccentric is supported, a crank-shaft opposite to and eccentric with said trunnion, and means for directly connecting said piston and said crank-shaft to transmit rotative motion thereto.

5. In a fluid-pressure engine, the combination with a cylinder, a piston, adapted to reciprocate in said cylinder, a valve-chest on said cylinder and having both its ends open to exhaust and having ports connecting said valve-chest and the opposite ends of said cylinder, of a valve accurately fitted and adapted to reciprocate therein, said valve having a central steam-receiving chamber, a trunnion on said valve or steam-chest, a suitable trunnion-bearing, a steam-pipe passing centrally through said trunnion and connecting the steam-receiving chamber of said valve, a non-rotating valve-operating eccentric or ring, a chambered eccentric-block, fixed guideways wherein said eccentric-block is adapted to slide, means for supporting said ways, and for shifting said eccentric-block to change the travel of said slide-valve, a crank-shaft opposite to and eccentric with said trunnion, and means for directly connecting said piston and said crank-shaft to transmit rotary motion thereto.

6. In a fluid-pressure engine, the combination with a cylinder, a piston adapted to reciprocate in said cylinder, a valve-chest on said cylinder and having both its ends open to exhaust and ports connecting said valve-chest and the opposite ends of said cylinder, of a valve accurately fitted and adapted to reciprocate therein, said valve having a central steam-receiving chamber, a trunnion on said valve or steam-chest mounted in a suitable bearing wherein it rotates, a steam-pipe passing centrally through said trunnion and connecting the steam-receiving chamber of said valve, a non-rotative eccentric-ring, an eccentric-block, fixed ways wherein said eccentric-block is supported and adapted to slide, a fixed tube connected to said guides and extending through said trunnion between said steam-pipe and the former, means for securing said tube to the fixed bearing of said trunnion, a rack in said eccentric-block, a toothed arm on the inner end of said steam-pipe meshing with said rack, means for rotating said steam-pipe, to shift said eccentric and for retaining the same in any fixed position, a crank-shaft opposite to and eccentric with said trunnion, and means for directly connecting said piston to said crank-shaft to transmit rotative motion thereto.

In testimony whereof I have hereunto set my hand in the presence of two subscribing witnesses.

ROBERT C. BERRY.

Witnesses:
  THOMPSON R. BELL,
  WM. O. MOREK.